(12) United States Patent
Wolford et al.

(10) Patent No.: US 8,468,876 B2
(45) Date of Patent: Jun. 25, 2013

(54) METHOD AND APPARATUS FOR LEAK DETECTION IN HORIZONTAL CYLINDRICAL STORAGE TANKS

(75) Inventors: Jimmy Wolford, Gladewater, TX (US);
Bernie Wolford, Jr., Spring, TX (US);
Clark Lockerd, Houston, TX (US);
Ricky Slaughter, Longview, TX (US)

(73) Assignee: Mass Technology Corporation, Kilgore, TX (US)

( * ) Notice: Subject to any disclaimer, the term of this patent is extended or adjusted under 35 U.S.C. 154(b) by 685 days.

(21) Appl. No.: 12/711,191

(22) Filed: Feb. 23, 2010

(65) Prior Publication Data

US 2010/0212404 A1    Aug. 26, 2010

Related U.S. Application Data

(60) Provisional application No. 61/154,645, filed on Feb. 23, 2009.

(51) Int. Cl.
*G01M 3/32* (2006.01)

(52) U.S. Cl.
USPC .......................................................... 73/49.2

(58) Field of Classification Search
USPC ................................................... 73/40, 49.2
See application file for complete search history.

(56) References Cited

U.S. PATENT DOCUMENTS

| | | |
|---|---|---|
| 4,630,478 A | 12/1986 | Johnson |
| 4,646,560 A | 3/1987 | Maresca, Jr. et al. |
| 4,862,733 A | 9/1989 | Hyfantis, Jr. et al. |
| 5,127,266 A | 7/1992 | Maresca et al. |
| 5,146,783 A | 9/1992 | Jansche et al. |
| 5,146,784 A | 9/1992 | Maresca, Jr. et al. |
| 5,201,212 A | 4/1993 | Williams |
| 5,267,467 A | 12/1993 | Caron |
| 5,375,455 A | 12/1994 | Maresca, Jr. et al. |
| 5,827,963 A | 10/1998 | Selegatto et al. |
| 5,950,487 A | 9/1999 | Maresca, Jr. et al. |
| 6,308,556 B1 | 10/2001 | Sagi et al. |
| 6,374,825 B1 | 4/2002 | Wallin et al. |

(Continued)

FOREIGN PATENT DOCUMENTS

| | | |
|---|---|---|
| EP | 1 651 939 | 1/2005 |
| WO | WO 2006/016931 A1 | 2/2006 |

OTHER PUBLICATIONS

In the U.S. Patent and Trademark Office, Final Office Action in re: U.S. Appl. No. 11/286,304 dated Oct. 29, 2009, 7 pages.

(Continued)

*Primary Examiner* — Daniel Larkin
(74) *Attorney, Agent, or Firm* — Patton Boggs LLP

(57) ABSTRACT

A storage tank leak detection system for detecting and measuring very small leaks in large horizontal cylindrical storage tanks. Embodiments include two highly precise quartz crystal type pressure transducers held at a constant temperature. A bubbler to achieve access to the hydrostatic pressure at the tank bottom and just below the liquid surface. First transducer and bubbler are used to measure fluid mass while second transducer and bubbler are used to measure fluid density then used in combination with data correction and regression techniques to yield a storage tank leak detection system for use in horizontal cylindrically shaped tanks with an extremely low leak detection threshold.

4 Claims, 2 Drawing Sheets

U.S. PATENT DOCUMENTS

| | | | |
|---|---|---|---|
| 6,499,353 | B1 | 12/2002 | Douglas et al. |
| 6,510,736 | B1 | 1/2003 | Van Ee |
| 6,549,857 | B2 | 4/2003 | Fierro et al. |
| 6,662,653 | B1 | 12/2003 | Scaliante et al. |
| 6,854,320 | B2 | 2/2005 | Wolford et al. |
| 6,854,345 | B2 | 2/2005 | Alves et al. |
| 6,944,570 | B2 | 9/2005 | Neeser et al. |
| 7,032,449 | B2 | 4/2006 | Rivas |
| 2007/0113623 | A1 | 5/2007 | Wolford et al. |
| 2007/0186623 | A1 | 8/2007 | Wolford et al. |

OTHER PUBLICATIONS

In the U.S. Patent and Trademark Office, Non-Final Office Action in re: U.S. Appl. No. 11/286,304 dated Oct. 22, 2007, 13 pages.

In the U.S. Patent and Trademark Office, Non-Final Office Action in re: U.S. Appl. No. 11/320,509 dated Apr. 24, 2007, 12 pages.

International Search Report for PCT/US2010/025116, issued Apr. 21, 2010.

International Search Report for PCT/US2004/21704, issued Feb. 9, 2005.

International Search Report for PCT/US2005/16930, issued Feb. 16, 2006.

METHOD AND APPARATUS FOR LEAK DETECTION IN HORIZONTAL CYLINDRICAL STORAGE TANKS

CROSS-REFERENCE TO RELATED APPLICATIONS

This application claims benefit to U.S. Provisional Patent Application No. 61/154,645, filed Feb. 23, 2009, the contents of which are incorporated by reference herein in their entirety.

BACKGROUND OF THE INVENTION

1. Field of the Invention

The present invention is directed towards a method and apparatus for providing a safe, precise, and cost-effective storage tank leak detection system and more particularly, to a method and apparatus wherein the containment integrity of a storage tank is determined by mass measurements of the stored product.

2. Background Information

Storage tanks play a vital role in today's economy. The economy, on a global scale, depends on the proper function of these tanks as they are prevalent in several industries and virtually every geographical region in the world. In light of the vital role these storage tanks play, the integrity of the tanks is placed at a premium. That is, storage tank owners are willing to invest huge sums of money in both the maintenance and inspection of such tanks.

These tanks come in all shapes and sizes, are found both below and above ground, and are used to store a wide range of materials. Storage tank capacities range from hundreds to millions of gallons and are used to store a staggering assortment of products, including hazardous material.

As one could imagine, there are a wide range of problems associated with measuring and determining storage tank integrity, particularly in horizontally disposed cylindrically shaped tanks. These horizontal cylindrically shaped tanks are the most prevalent tank type in underground storage service. The horizontally disposed, cylindrical shape is positioned so that product surface area changes with fluid level, which will change independent of any tank leak due to fluid expansion or contraction as a result of fluid temperature changes. Such positioning and shape greatly complicates direct measurement of leaks by typical means. Typical leak detection methods require the application of an internal pressure or vacuum used in conjunction with multiple detection probes, including water level, product level, acoustic and fluid temperature. By relying on secondary indications of leaks, typical leak detection methods compromise the leak detection process, expose the tank to failure due to the applied test pressure or vacuum and open the possibility that a real leak is masked by the very application of the test. Also, such methods do not monitor loss by vaporization.

Use of a typical mass measurement based leak detection system in horizontal cylindrically shaped tanks without a direct and continuous measurement of the density of the tank's contents is fraught with the possibility for incorrect or inconclusive leak determinations. One can easily envision a scenario where the fluid product level in the tank rises due to the warming (expansion) of the tank's liquid contents even in the presence of a small leak from the tank.

However, the recognized difficulties in measuring, determining and preventing storage tank leaks does not mitigate the duties or liabilities imposed on responsible parties. Tremendous environmental and economic consequences and the threat of litigation and clean up costs associated with storage tank leaks force responsible parties to invest large sums of money in the maintenance and inspection of the tanks. Tank inspections are costly with respect to the amount of money spent, the danger presented to the inspectors and the environment, and production downtime. In fact, these inspections often remove a tank from service for more than one month. The threat of liability also forces responsible parties to spend money unnecessarily for the maintenance of these tanks. Moreover, liability does not end with litigation and clean-up costs.

Currently, responsible parties are, in some countries, being incarcerated as a direct result of storage tank leaks. These leaks have contaminated surrounding ground water, some of which serves as drinking water for local residents. As such, the facilities associated with such incidents have been shut down until compliance with emissions regulations can be established beyond reasonable doubt. Such proof, in turn, is dependent on proof of reliable and sufficiently accurate detection systems and methods for proving such compliance. Each day the shuttered facilities remain inoperative adds to an already tremendous amount of money lost.

Prior to the present invention (to be described in detail hereafter), there are simply no known direct leak measurement systems. Similarly there are no known systems for direct and quantitative measurement of potential leaks in horizontally disposed cylindrical tanks of 50,000 gallon capacity and larger. The present invention addresses this void through the combination of an extremely precise mass measurement system and an extremely precise and real-time measurement of the density of a horizontally disposed storage tank's contents.

Clearly, for the reasons set forth above, there is a dire and immediate need for the ability to determine, with far more precision than presently possible through use of presently available systems and methods, the presence and degree of leakage from such storage tanks, at least to the extent of proving compliance with applicable storage tank leakage regulations or statutes.

Storage tank leak detection systems are known in the art; however, these products are fraught with problems. The present systems are imprecise, or provide erroneous data for any or all of reasons including: the consistency of the soil acting as the tank's foundation, the temperature (thus density) stratification of the tank's fluid contents, product loss as vapor, extraneous noise sources, the effects of ground water table level, previous soil contamination, and/or tank shell dynamics.

In light of the severe consequences of failing to detect significant storage tank leaks, presently not detectable or severely compromised through use of known systems or methods, there is a compelling need for a system and method by which one can detect very small leaks even in large and very large horizontally disposed cylindrically shaped tanks, ideally in a safe and cost effective manner.

It would well serve those who are responsible for maintaining storage tank integrity to provide a safe, precise, and cost-effective direct leak detection system that 1) does not depend on the application of an internal force (pressure or vacuum) to create an indirect indication of a leak, 2) that does not require the simultaneous measurement of independent variables such as a) acoustic noise due to a leak of a gas into or out-of the tank, b) tank bottom water level due to a leak in the tank below the external groundwater level, c) fluid temperature to compensate for fluid expansion or contraction, d)

fluid level and maybe used in an efficient manner thereby preserving industrial and environmental resources.

SUMMARY OF INVENTION

In view of the foregoing, it is an object of the present invention to provide a storage tank leak detection apparatus with a very low detection threshold that maybe used in an efficient manner thereby preserving industrial and environmental resources.

It is another object of the present invention to provide an apparatus for precise storage tank leak detection.

It is another object of the present invention to provide an apparatus for cost-effective storage tank leak detection.

It is another object of the present invention to provide an apparatus for non-intrusive storage tank leak detection.

It is another object of the present invention to provide an apparatus for storage tank leak detection where the contents of the storage tank do not have to be removed.

It is another object of the present invention to provide an apparatus for storage tank leak detection where no chemical additives are involved.

It is another object of the present invention to provide an apparatus for immediate storage tank leak detection.

It is another object of the present invention to provide an apparatus for conclusive storage tank leak detection.

It is another object of the present invention to provide an apparatus for quantitative storage tank leak detection.

It is another object of the present invention to provide an apparatus to determine whether head changes are directly attributable to leaks or other effects.

It is another object of the present invention to provide an apparatus for storage tank leak detection that does not depend on fluid temperature changes.

It is another object of the present invention to provide an apparatus for storage tank leak detection that does not depend on fluid stratification.

It is another object of the present invention to provide an apparatus for storage tank leak detection that does not require tank stabilization time.

It is another object of the present invention to provide an apparatus for storage tank leak detection that requires only minimal tank preparation.

It is another object of the present invention to provide an apparatus for storage tank leak detection that has been evaluated by an EPA-recognized, independent third party laboratory.

It is another object of the present invention to provide an apparatus for storage tank leak detection that can directly measure minute changes in product density.

It is another object of the present invention to more accurately measure product density changes through the use of a support structure with minimal or no expansion due to temperature changes.

It is another object of the present invention to provide a method with a very low detection threshold that may be used in an efficient manner thereby preserving industrial and environmental resources.

It is another object of the present invention to provide a method for safe storage tank leak detection.

It is another object of the present invention to provide a method for precise storage tank leak detection.

It is another object of the present invention to provide a method for cost-effective storage tank leak detection.

It is another object of the present invention to provide a method for non-intrusive storage tank leak detection.

It is another object of the present invention to provide an apparatus for storage tank leak detection where the contents of the storage tank do not have to be removed.

It is another object of the present invention to provide a method for storage tank leak detection where no chemical additives are involved.

It is another object of the present invention to provide a method for immediate storage tank leak detection.

It is another object of the present invention to provide a method for conclusive storage tank leak detection.

It is another object of the present invention to provide a method for quantitative storage tank leak detection.

It is another object of the present invention to provide a method to determine whether head changes are directly attributable to leaks or other effects.

It is another object of the present invention to provide a method for storage tank leak detection that does not depend on fluid temperature changes.

It is another object of the present invention to provide a method for storage tank leak detection that does not depend on fluid stratification.

It is another object of the present invention to provide a method for storage tank leak detection that does not require tank stabilization time.

It is another object of the present invention to provide a method for storage tank leak detection that requires only minimal tank preparation.

It is yet another object of the present invention to provide a method for storage tank leak detection that has been evaluated by an EPA-recognized, independent third party laboratory.

It is another object of the present invention to provide a method for storage tank leak detection that directly measures changes in product density.

It is an other object of the present invention to provide a method for storage tank leak detection where measurements of product density are not compromised by changes in the distance between reference points due to thermal expansion or contraction of the measurement probe support structure.

The present invention provides a safe, extremely precise, and cost-effective solution to the problems mentioned above. Test results associated with the present invention provide an accurate determination of containment integrity, transfer quantities and in the event of leakage, a precise volumetric leak rate. The present invention is not restricted by fluid type, fluid temperature, fluid level, or tank size.

Further, no physical inspection of the tanks is required for practice of the present system. As such, there is no need to drain, clean, or enter the tank. With no need for physical inspection, neither inspectors nor the environment are exposed to the contents of the tank. With no need to drain the storage tank, practice of the present invention does not produce hazardous by-products associated with the draining/cleaning process, and danger from transport and storage of the drained product is avoided. System control techniques and data correction software provide for precision not possible with products known in the art. Finally, the systems and methods of the present invention do not require chemical additives to be mixed with the tank contents. As such, incidental spills and leaks are avoided altogether.

Practice of the present invention is cost effective. Tank structure or the foundation and surrounding soil are not disturbed, as such, set-up time and capital investment costs are minimized. The present invention is non-intrusive and does not require manual inspection of the tank. Therefore, operation of the tank is not hindered, so there is minimal production downtime. There is no cost related to the handling, transport, disposal, or storage of removed hazardous material. Finally, testing can be accomplished simultaneously to further reduce the total time involved and rapidly identify problem areas.

The determinative feature of mass measurement leak detection systems is the sensitivity of the apparatus. That is, the lower the leak detection threshold level of a device, the more effective it will be at detecting leaks. The present invention, by employing a combination of techniques and components not known in the art, provides a leak detection threshold that is much lower than any known device. The system holds the mass measurement component's temperature constant during the entire measurement process. Further, the system corrects errors in the data attributed to storage tank shell dynamics and inherent imprecision in differential pressure mass measurement devices. This data correction process will be discussed in detail in the specification to follow.

As mentioned, tank shell variations and fluid temperature changes limit the effectiveness of presently known mass measurement detection systems; hence there are none available for larger tank sizes. The systems and methods of the present invention overcome tank shell variations through data collection and data correction techniques. The systems and methods of the present invention overcome fluid expansion or contraction due to temperature variations and stratification through the direct and precise measurement of average product density in real-time. First, data is collected through use of a quartz crystal type differential pressure transducer (the specifications and use of this transducer will be explained in more detail in the Detailed Description of the Preferred Embodiment). A Programmable Logic Controller (PLC) connected to the pressure transducer, records pressure data over a period of time (dependent upon the size of the tank and the detection threshold desired). The atmospheric temperature and barometric pressure are recorded and precisely analyzed to correct for any changes in the head of the fluid within the tank due to external conditions. The fluid temperature is recorded and precisely analyzed to correct for apparent changes in the observed mass due to tank shell temperature variations. This data is regressed to give a line slope that is converted to a leak rate, usually in gallons per hour.

Data generated by the transducer is collected on a continuous basis. Only data containing a sufficiently low amount of extraneous noise is analyzed. Such data is usually obtained after a brief stabilization period, which is preferably about thirty (30) minutes. Also, data correction software accounts for the coefficient of thermal expansion for any given storage tank construction material. The data is corrected for variations in fluid temperature and therefore fluid density, atmospheric conditions and variations in the tank shell. These measurements and corrections allow the system to repeatedly achieve the stated accuracy in real world conditions on a routine basis.

For even greater precision, the leak detection system of the present invention provides for an independent barometric pressure measuring means to constantly record the barometric pressure during the data collection process. This independent barometric pressure measuring means, used in combination with data correction software, corrects any dual mode drift associated with the individual pressure transducers.

Practice of the apparatus involves connecting a regulated inert gas supply to two bubblers securely mounted to a bubbler support rod (having a very low coefficient of thermal expansion), then lowering the bubblers into the tank on the support rod, one to the bottom surface of the storage tank and the other to a point just below the product level. A differential reference for the bottom bubbler is placed just above the liquid surface. A second measurement of the differential pressure between the two bubblers is made so as to directly measure changes in product density. The pressure, measured at the tank floor ("tank bottom pressure") and atmospheric and vapor pressure measured just above the liquid surface, is recorded by a highly accurate differential pressure transducer on a real time basis and post processed using a data analysis routine to accurately calculate any changes in the mass of fluid contained within the tank to determine if there is a loss. The present system, using the specified transducer, and when used in the manner and with the data interpretation described herein, is capable of leaks at a threshold of less than 0.1 gallons per hour with a probability of detection of 95% in a 50,000 gallon capacity tank—far more accurate than possible with any presently available quantitative leak detection system.

The method and apparatus of the present invention provides a safe and effective way to detect very small leaks in large horizontal cylindrical tanks. Particularly, the present invention provides a tremendous improvement in accuracy and leak detection threshold, allowing its operators to achieve greater results than presently thought possible.

Thus, in satisfaction of the above objects, an embodiment of the present invention provides systems and methods for solving each of the stated problems with presently available storage tank leak detection systems.

BRIEF DESCRIPTION OF THE DRAWINGS

Annex A is a printout of the industrial controller program source code referred to herein as the PLC program.

DETAILED DESCRIPTION OF THE PREFERRED EMBODIMENT

Figure 1:
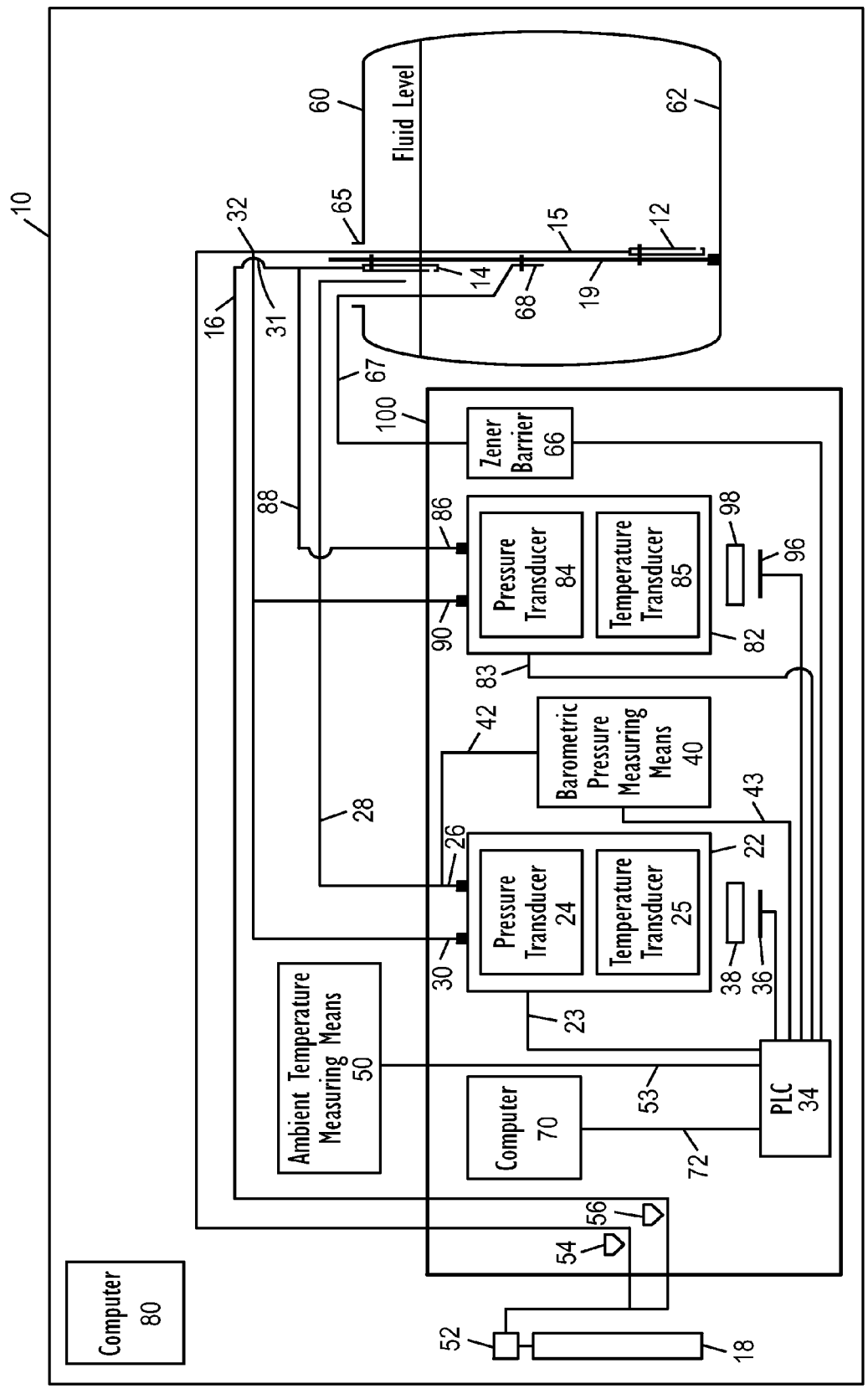
FIG. 1 is a block diagram depicting the general layout of the present leak detection system.
Figure 2:
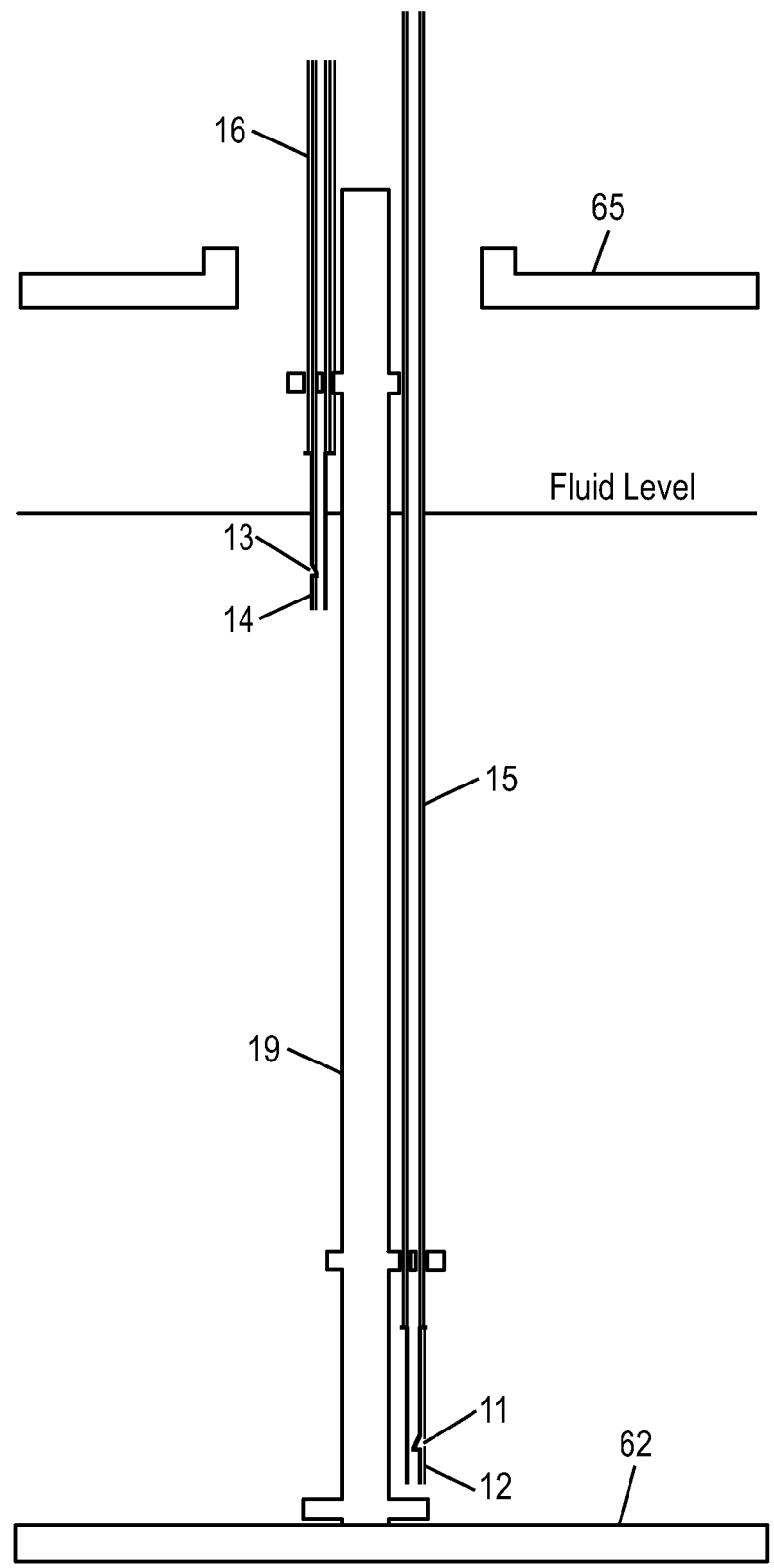
FIG. 2 is an elevational, sagittal cross sectional view of the multi-bubbler probe of the leak detection system.

In the drawings and the description that follows, referring to FIGS. 1 and 2, a preferred embodiment of a storage tank leak detection system according to the present invention is generally designated as system 10.

Referring to FIG. 1, an embodiment of the present invention is shown to include an inert gas pressure reduction 52 and flow rate regulators 54 and 56, which provide a clean and steady supply of an inert gas such as nitrogen, from a compressed cylinder 18 to a plurality of in-tank bubblers 12 and 14 via bubbler tubes 15 and 16, respectively.

Support rod 19, supports releasably attached in-tank bubblers 12 and 14, and is placed in the horizontally disposed cylindrically shaped storage tank ("tank") and removably attached to the bottom of the tank. Support rod 19 is preferably constructed from materials with physical and chemical properties resistive to expansion caused by temperature change. In this embodiment support rod 19 is constructed from Super-Invar but support rod 19 could also be constructed from similar materials with similar properties. The in-tank bubbler 12, releasably attached to the bottom of support rod 19, provides for the formation and release of inert gas bubbles in a consistent manner with minimal pressure variation. The minimum inert gas pressure required to consistently form and release bubbles at the bottom of the tank's contents serves as a proxy for the hydrostatic pressure at the bottom of the tank. The in-tank bubbler 14, releasably attached near the top of support rod 19, is positioned on support rod 19 (by the operator) so that the bubbler is approximately one inch below the liquid surface. The in-tank bubbler 14, which is mounted near the top of support rod 19, provides for the formation and release of inert gas bubbles in a consistent manner with minimal pressure variation. The minimum inert gas pressure required to consistently form and release bubbles just below the liquid surface of the tank's contents serves as a proxy for the hydrostatic pressure just below the liquid surface.

The formation and release of inert gas bubbles in a consistent manner with minimal pressure variation is accomplished by way of flow rate regulators 54 and 56 and specially shaped exits from small metal tubings 11 and 13 that convey the inert gas within the in-tank bubblers 12 and 14. These exits are in the form of a notch cut into the side of the metal tubing at an approximately 30 degree angle to the tubings' vertical orientation. In-tank bubblers 12 and 14 are preferably constructed of a substantially non-corrosive metal, stainless steel, for example, however, any material that is corrosion resistant and of sufficient density is adequate for use with the present invention.

Referring to FIG. 2, at its proximate end bubbler tube 15 forms a gas tight seal with in-tank bubbler 12. Extending from in-tank bubbler 12, bubbler tube 15 passes through storage tank top surface access 65 to an area outside of the class 1 region of storage tank 60 (class 1 region refers to the National Electric Code designated hazardous areas). Bubbler tube 15 serves as a conduit for pressurized inert gas flowing to the in-tank bubbler 12.

At its proximate end bubbler tube 16 forms a gas tight seal with in-tank bubbler 14. Extending from in-tank bubbler 14, bubbler tube 16 passes through storage tank top surface access 65 to an area outside of the class 1 region of storage tank 60 (class 1 region refers to the National Electric Code designated hazardous areas). Bubbler tube 16 serves as a conduit for pressurized inert gas flowing to the in-tank bubbler 14.

Referring back to FIG. 1, outside the aforementioned class 1 region but sufficiently close to tank 60, a measurement, control and data collection unit 100 (MCDC for short) is placed. Contained within this MCDC 100 are differential pressure transmitters 22 and 82. In the preferred embodiment, differential pressure transmitters 22 and 82 are comprised of highly precise quartz crystal pressure transducers 24 and 84 respectively and highly precise quartz crystal temperature transducers 25 and 85. Transducers 24 and 84 contain an oscillating quartz crystal and have a pressure resolution of $1 \times 10^{-8}$ of full scale. The ultimate resolution achievable with a transducer is limited by its stability and repeatability. System 10 greatly improves upon the stability and repeatability of the transducers thereby increasing the true resolution of transducers 24 and 84. In system 10, transmitters 22 and 82 have been insulated. As will be further described in this section, transducers 24 and 84 are held at a constant temperature to achieve high stability and repeatability.

Quartz crystal type pressure transducer 24 is further comprised of transducer low side 26. Transducer low side 26 is a differential reference that receives the atmospheric pressure value at the liquid surface (atmospheric pressure and vapor pressure directly above the liquid surface). Transducer low side tube 28 forms a gas tight seal at its proximate end with transducer low side 26 and extends through the tank access 65 to a location just above the tank 60 liquid contents. Transducer low side tube 28 allows transducer low side 26 to receive the atmospheric pressure from the reference point at the liquid surface.

Quartz crystal type pressure transducer 24 is further comprised of transducer high side 30. Quartz crystal type pressure transducer high side 30 is a pressure reference point, which measures the sum of the atmospheric (barometric) and hydrostatic pressure near the tank bottom surface 62. Transducer high side tube 32 forms a gas tight seal at its proximate end with transducer high side 30 and extends to a gas tight "tee" connection with bubbler hose 15 near tank access 65.

Transducer 24 measures the pressure differential between the transducer low side 26 and transducer high side 30 to arrive at the pressure exerted by the mass of the tank contents while eliminating the pressure variations due to change in atmospheric pressure by way of their inclusion in both the high side and low side pressure measurements. Transmitter 22, communicating digitally, then sends this processed information to PLC 34. This data is transmitted along data transfer means 23. In the preferred embodiment, data transfer means 23 is a standard bus communications cable. However, one could easily envision a data transfer means such as wireless communication, that would work equally as well.

Quartz crystal type pressure transducer 84 is further comprised of transducer low side 86. Transducer low side 86 is a differential reference that receives the hydrostatic pressure value just below the liquid surface. Transducer low side tube 88 forms a gas tight seal at its proximate end with transducer low side 86 and extends through the tank access 65 to a location just below the tank 60 liquid contents. Transducer low side tube 88 allows transducer low side 86 to receive the hydrostatic pressure from the reference point just below the liquid surface.

Quartz crystal type pressure transducer 84 is further comprised of transducer high side 90. Quartz crystal type pressure transducer high side 90 is a pressure reference point, which measures the sum of the atmospheric (barometric) and hydrostatic pressure near the tank bottom surface 62. Transducer high side tube 31 forms a gas tight seal at its proximate end with transducer high side 90 and extends to a gas tight "tee" connection with bubbler hose 15 near tank access 65.

Transducer 84 measures the pressure differential between the transducer low side 86 and transducer high side 90 to arrive at the pressure exerted by the mass of the tank contents between bubblers 12 and 14 while eliminating the pressure variations due to change in atmospheric pressure or hydrostatic pressure due to fluid above bubbler 14 by way of their inclusion in both the high side and low side pressure measurements. Transmitter 82, communicating digitally, then sends this processed information to PLC 34. This data is transmitted along data transfer means 83. In the preferred embodiment, data transfer means 83 is a standard bus communications cable. However, one could easily envision a data transfer means such as wireless communication, that would work equally as well.

Quartz crystal temperature transducers 25 and 85 independently serve as a part of a temperature regulation scheme used to keep pressure transducers 24 and 84 respectively at a constant temperature during the data gathering process. Quartz crystal temperature transducers 25 and 85 communicate digitally via transmitters 22 and 82 with the PLC 34. This data is transmitted along data transfer means 23 and 83, respectively. In the preferred embodiment, data transfer means 23 and 83 comprise a standard bus communications cable. However, one could easily envision a data transfer means such as wireless communication that would work equally as well. In the preferred embodiment PLC 34, through a control loop, generates an output that activates resistive heaters 36 and 96 independently, which in combination with heat sinks 38 and 98 regulates the temperature of pressure transducers 24 and 84, respectively. While the above temperature regulating scheme has been described with reference to one embodiment, one could easily imagine other temperature regulation schemes that would work equally as well.

The use of this temperature regulation scheme to hold pressure transducers 24 and 84 at a constant temperature further increases the precision of the apparatus. The absolute temperature at which pressure transducers 24 and 84 are maintained is not critical, rather constancy of temperature affects the stability and repeatability of the subject measurements. As a matter of practicality, the temperature of pressure transducers 24 and 84 are maintained according to the presently preferred mode of the present invention, at a temperature of approximately 200 F above the maximum expected ambient temperature during the course of the test.

Also contained within MCDC 100 is barometric pressure measuring means 40. Barometric measuring means 40 serves as an independent reference for true atmospheric pressure. In the preferred embodiment, barometric pressure measuring means 40 maybe any standard barometer that sends signals to be processed by PLC 34. Barometric measuring means 40 is very useful for increasing the precision of system 10. The present invention employs barometric measuring means 40 to serve as an independent measure of true atmospheric pressure above the tanks liquid contents thereby allowing for data correction over any extended period of time. As will be discussed in this section, data correction using values taken from barometric pressure measuring means 40 greatly increases the precision of the current invention.

Barometric measuring means tube 42 forms a gas tight seal at its proximate end with barometric measuring means 40 and forms a gas tight seal at its distal end where it "tees" into transducer low side tube 28. Barometric measuring means tube 42 allows barometric measuring means 40 to receive the barometric pressure from the reference point at the surface of liquid within storage tank 60. Data transfer means 43 extends from the output of barometric pressure measuring means 40 to PLC 34. In the preferred embodiment, data transfer means 43 is a standard bus communications cable. However, one could easily envision a data transfer means, such as wireless communication that would work equally as well.

Also system 10 includes an ambient temperature measurement means 50. Ambient temperature measurement means 50 is mounted outside of the class I region of storage tank 60, so as to provide an accurate measure of the ambient temperature of the air surrounding tank 60 thereby allowing for data correction for tank shell expansion and contraction (in the case of aboveground tanks) over any extended period of time. This data is transferred along data transfer means 53 to PLC 34. Ambient temperature measuring means 50 is very useful for increasing the precision of system 10. In the preferred embodiment, data transfer means 53 is a standard bus communications cable. However, one could easily envision a data transfer means, such as wireless communication, that would work equally as well.

Also system 10 includes a fluid temperature measurement means 68. Fluid temperature measurement means 68 is mounted on support rod 19 so as to provide an accurate measure of the fluid temperature at the mid level of tank 60, thereby allowing for data correction for tank shell expansion and contraction (in the case of both aboveground and underground tanks) over any extended period of time. This data is transferred along data transfer means 67 by way of zener barrier 66 to PLC 34. The zener barrier 66 renders data transfer means 67 and fluid temperature transmitter 68 intrinsically safe. Fluid temperature measuring means 68 is very useful for increasing the precision of system 10. In the preferred embodiment, data transfer means 67 is a standard bus communications cable. However, one could easily envision a data transfer means, such as wireless communication, that would work equally as well.

Also contained within MCDC 100 is the man-machine interface computer 70. Although not necessary, PLC 34 and computer 70 are typically housed in a common enclosure, such as MCDC unit 100. In accordance with the described routines to follow and the exemplary computer code depicted in Annex A attached hereto and incorporated herein by reference, PLC 34 processes data received from transmitters 22 and 82, atmospheric pressure measuring means 40, ambient temperature measurement means 50 and fluid temperature measurement means 68. PLC 34 also controls the temperature of pressure transducers 24 and 84 by means of resistive heaters 36 and 96 and heat sinks 38 and 98 respectively. PLC 34 communicates with man-machine interface computer 70 by data transfer means 72. In the preferred embodiment, data transfer means 72 is a standard bus communications cable. However, one could easily envision a data transfer means, such as wireless communication, that would work equally as well.

Man-machine interface computer 70 provides the means whereby the operator interacts with the system to: log data, monitor system operation, enter temperature set points, record job specific physical site and client data, trouble shoot detected errors and enter password keys to authorize data collection.

The software commences operation with the initialization of data collection from within and around the tank. Data is automatically collected via industrial computer controlled programming over some length of time, preferably 6 to 18 hours. The length of the test is dependent on tank size and the desired threshold of leak detection.

As will be discussed and illustrated hereafter, remote computer 80 contains software that performs linear regressions of data downloaded from the man-machine interface computer 70. This regression detects minuscule changes in the mass of the stored product, thereby indicating the presence of the smallest of leaks. As the compilation of data grows, the more precise the regression becomes. The post processing module and software of remote computer 80 is independent of PLC 34 and the man-machine interface computer 70.

There are three software programs or modules involved with the storage tank leak detection system of the present invention: the PLC program, the man-machine interface computer program and the post processing program operated on remote computer 80.

The PLC program is executed by the PLC 34 and is responsible for obtaining (subroutine Measure) data from transmitters 22 and 82, controlling the temperature of transmitters 22 and 82 (subroutines Temp-Ctrl and Temp-Ctrl2), obtaining transmitters 22 and 82 temperature (subroutine Measure), and backup data storage. The data acquired by the PLC program is stored within the PLC 34 in non-volatile memory.

The PLC program interrogates the differential pressure transmitters (transmitters 22 and 82) via a serial connection. The pressure read from differential pressure transmitters 22 and 82 represent the total head due to fluid and the fluid density respectively. These pressure values are modified by two additional variables in order to improve the accuracy of the reading. The post processing program performs measured head corrections for a) tank shell temperature changes based on measurements of ambient temperature and fluid temperature and b) atmospheric pressure changes which otherwise would skew the data due to dual mode drift. This post processing is intended solely to detect variations of contents of storage tank 60 due to leakage and eliminate variations due to environmental changes. Any change in tank diameter is accommodated in the calculations thus properly attributing substantially all variations in differential pressure to variations in the content of storage tank 60, such as through leakage.

The PLC subroutines Measure and Tx-Cmplt-Int obtain pressure readings and transducer temperature readings from transmitters 22 and 82. This may be performed every one minute.

Subroutine Temp-Ctrl controls pressure transducer 24 temperature and subroutine Temp-Ctrl2 controls pressure transducer 84 temperature, which is performed as follows: the operator entered temperature set point is compared to the digitally communicated transducer temperature, the difference or error is then used to establish the resistive heater output.

The remaining recorded variables are also obtained on a one minute time frame. This is accomplished in the Measure subroutine.

Finally, the PLC program is responsible for data storage. This is accomplished in subroutine Record. One record per minute is stored. The organization of the data is by date and time. The record for every minute will include: (1) the differential pressure representing the hydrostatic pressure produced by the fluid mass (as a floating-point number, IEEE 32 bit format), (2) the differential pressure representing the hydrostatic pressure between the two bubblers (as a proxy for fluid density) (as a floating-point number, IEEE 32 bit format), (3) the barometric pressure (as ×1000-16 bit integer), (4) the ambient temperature (as ×100-16 bit integer), (5) the fluid temperature (as ×100-16 bit integer) and (6) the transducer temperatures (as ×100-16 bit integer).

The system features a man-machine interface computer 70 to allow direct operator interaction with the unit, to accept the operator's transducer temperature setpoints, to allow the operator to graphically visualize the differential pressure data collection via a time based chart, to allow the operator to determine the state of the machine, to allow the operator to trouble-shoot any system recognized errors, to provide a second (primary) means for logging the collected data, to allow the operator to authorize data collection by way of entry of a predetermined "run key", to allow the operator to record client, location, tank characteristics and dimensions and fluid physical characteristics.

The third software program of the storage tank leak detection system of the claimed invention is the post processing program. Remote computer 80 performs this program. Linear regression of logged data, is performed as follows. The data files created by the PLC program are read in, these include time stamped values for measured hydrostatic pressure created by the fluid mass, density pressure created by the fluid mass between the two bubblers, ambient temperature, fluid temperature, transducer temperatures, and atmospheric pressure, along with the tank dimensions and the specific gravity of the tank contents. Three graphical presentations of hydrostatic pressure (fluid mass) versus time are created, one of the raw hydrostatic pressure data, one of the density and tank shell temperature corrected hydrostatic pressure data and one of the density and tank shell temperature corrected hydrostatic pressure data with atmospheric pressure corrections. Tank shell temperature corrections are made on the basis of the coefficient of thermal expansion of the construction material of the tank and the calculated tank shell temperature. The calculated tank shell temperature is derived from a combination of the fluid temperature and the ambient temperature at a ratio entered by the software operator, typically in the range of 0.5 to 1.0. The selection of the ratio to apply is dependent upon tank physical conditions such as the presence of external insulation, is the tank above or below ground level, weather conditions including rain, wind and humidity and the tank contents (the appropriateness of the selected ratio is further verified by the method presented below). Atmospheric pressure corrections are made based on the application of a drift correction coefficient applied to the hydrostatic pressure data (this drift correction coefficient is determined empirically through the observation of head variations as a function of barometric pressure changes in an otherwise leak free and well insulated test tank during initial system commissioning). The operator selects data periods and the software performs linear regressions of the three hydrostatic pressure data series over these periods. The resultant slope of the linear regression of fluid density and tank shell temperature corrected hydrostatic pressure with barometric pressure corrections is converted to a leak rate on the basis of the tank's dimensions and fluid level and the specific gravity of the tank contents.

It is believed that, while safe and efficient, the present device will obviate significant inconvenience and provide substantial utility to those who wish to detect leaks in horizontal cylindrically shaped storage tanks. Specifically, the present device will allow very small leaks to be detected in large storage tanks in a consistent and cost-effective manner.

Although the invention has been described with reference to specific embodiments, this description is not meant to be construed in a limited sense. Various modifications of the disclosed embodiments, as well as alternative embodiments of the inventions will become apparent to a person skilled in the art upon the reference to the description of the invention. It is therefore contemplated that the appended claims will cover such modification that fall within the scope of the invention.

We claim:

1. An apparatus for detecting leaks in a liquid storage tank comprising:
    differential pressure sensor means having a low pressure measurement component and
        a high pressure measurement component;
        said high pressure measurement component being configured for measuring tank bottom pressure within a liquid in which a bubbler is immersed; and
        said low pressure measurement component being configured for receiving data indicative of atmospheric and vapor pressure substantially at the surface of said liquid;
    barometric pressure measuring means configured for measuring atmospheric pressure substantially at the surface of said liquid;
    a second differential pressure sensor means for contents density measurement having a low pressure measurement component and a high pressure measurement component;
        said high pressure measurement component being configured for measuring tank bottom pressure within a liquid in which a bubbler is immersed;
        said low pressure measurement component being configured for measuring fluid pressure just below the liquid surface; and
    barometric pressure and differential pressure calculation means configured for receiving first and second data reflecting, respectively, said tank bottom pressure and of said barometric pressure substantially at said surface of said liquid, and for adjusting said first data to substantially eliminate variations upon said measurements of said tank bottom pressure caused solely from atmospheric pressure variations to yield an atmospheric pressure adjusted tank bottom pressure;

ambient temperature measurement means for measuring ambient temperature near said storage tank;

tank dynamic and barometric pressure adjusted tank bottom pressure calculation means configured for receiving third data indicative of said atmospheric pressure adjusted tank bottom pressure, for receiving fourth data indicative of ambient temperature measurements by said ambient temperature measurement means, for receiving fifth data indicative of expansion characteristics of said storage tank, and for adjusting said third data with reference to said fourth and fifth data to substantially eliminate variations upon measurements and calculations of said barometric pressure adjusted tank bottom pressure, caused solely by dimensional changes in said storage tank resulting from atmospheric temperature variations, to yield a tank dynamic adjusted tank bottom pressure;

tank content average density calculation means for calculating average fluid density throughout the hydrostatic column; and tank content mass calculation means for calculating mass contents of said storage tank substantially based on said tank dynamic adjusted tank bottom pressure, average fluid density, operator input data reflecting tank shape and configuration and operator input data reflecting physical characteristics of said contents of said storage tank.

2. The apparatus of claim 1 further comprising temperature management means configured for maintaining the temperature of said differential pressure sensor means substantially at an operator-specified temperature.

3. A method for detecting leaks in a storage receptacle, comprising the steps of:

a) selecting a mass detection system comprising:

differential pressure sensor means having a low pressure measurement component and a high pressure measurement component;

said high pressure measurement component being configured for measuring tank bottom pressure within a liquid in which a bubbler is immersed; and said low pressure measurement component being configured for receiving data indicative of atmospheric pressure substantially at the surface of said liquid; and barometric pressure measuring means configured for measuring atmospheric pressure substantially at the surface of said liquid when said protective enclosure means is immersed therein;

a second differential pressure sensor means for contents density measurement having a low pressure measurement component and a high pressure measurement component;

said high pressure measurement component being configured for measuring tank bottom pressure within a liquid in which a bubbler is immersed;

said low pressure measurement component being configured for measuring fluid pressure just below the liquid surface;

barometric pressure and differential pressure calculation means configured for receiving first and second data reflecting, respectively, said tank bottom pressure and of said barometric pressure substantially at said surface of said liquid, and for adjusting said first data to substantially eliminate variations upon said measurements of said tank bottom pressure caused solely from atmospheric pressure variations to yield an atmospheric pressure adjusted tank bottom pressure;

ambient temperature measurement means for measuring ambient temperature near said storage tank;

tank dynamic and barometric pressure adjusted tank bottom pressure calculation means configured for receiving third data indicative of said atmospheric pressure adjusted tank bottom pressure, for receiving fourth data indicative of ambient temperature measurements by said ambient temperature measurement means, for receiving fifth data indicative of expansion characteristics of said storage tank, and for adjusting said third data with reference to said fourth and fifth data to substantially eliminate variations upon measurements and calculations of said barometric pressure adjusted tank bottom pressure, caused solely by dimensional changes in said storage tank resulting from atmospheric temperature variations, to yield a tank dynamic adjusted tank bottom pressure;

tank content average density calculation means for calculating average fluid density throughout the hydrostatic column;

tank content mass calculation means for calculating mass content data representative of the contents of said storage tank substantially based on said tank dynamic adjusted tank bottom pressure, average fluid density, operator input data reflecting tank shape and configuration and operator input data reflecting physical characteristics of said contents of said storage tank; and b) selecting data storage means for collecting a plurality of mass content and fluid density data as generated by said tank content mass calculation means over a plurality of points in time;

c) selecting computing means configured for generating a human perceptible indication of changes in said mass content data between a plurality of said points in time;

d) actuating said mass detection system; and e) observing data indicative of changes in said mass content data attributable to leakage of said storage tank for detection of such leakage.

4. The method of claim 3 further comprising the steps of:

f) securing all input and outflow orifices of said storage tank before said actuation of said mass detection system; and g) substantially selectively processing said mass content data at an installation site of said system.

* * * * *